United States Patent [19]

Morgan

[11] 4,028,773

[45] June 14, 1977

[54] SWIVEL CASTER

[75] Inventor: Lawrence M. Morgan, Anoka, Minn.

[73] Assignee: The Cornelius Company, St. Louis Park, Minn.

[22] Filed: Oct. 28, 1975

[21] Appl. No.: 626,122

[52] U.S. Cl. ................. 16/35 R; 16/35 D; 280/79.1

[51] Int. Cl.² ........................ B60B 33/00

[58] Field of Search .......... 16/35 R, 35 D; 403/93, 403/328; 280/79.1, 79.2, 79.3; 292/263

[56] References Cited

UNITED STATES PATENTS

| | | | |
|---|---|---|---|
| 1,225,322 | 5/1917 | Forth | 292/263 X |
| 1,318,148 | 10/1919 | Herwig, Jr. | 403/93 X |
| 1,861,919 | 6/1932 | Hill | 16/35 R |
| 1,896,234 | 2/1933 | Hathorn | 16/35 D X |
| 2,021,886 | 11/1935 | Carpenter et al. | 16/35 R |
| 2,154,525 | 4/1939 | Noros et al. | 280/79.2 X |
| 2,251,567 | 8/1941 | Gould et al. | 16/35 R |
| 2,481,948 | 9/1949 | Pruitt | 16/35 D |
| 3,439,672 | 4/1969 | Fisher | 403/93 |
| 3,926,532 | 12/1975 | Schleuker et al. | 403/328 |

Primary Examiner—Werner H. Schroeder
Assistant Examiner—Conrad L. Berman
Attorney, Agent, or Firm—Henry C. Kovar

[57] ABSTRACT

A swivel caster is disclosed having a mounting plate, swivel yoke, swivel bearing, a wheel on the yoke, and structure which will locate and cammingly index the yoke and plate in a predetermined relative radial position and cammingly release the index in response to a torque force between the yoke and the plate.

1 Claim, 2 Drawing Figures

SWIVEL CASTER

BACKGROUND OF THE INVENTION

1. Field of the Invention

This invention pertains to a swivel caster which will radially locate and index the wheel with respect to the mounting plate for straight tracking and which will release the index upon application of a force applied laterally to the index.

2. Prior Art

The prior art caster has a lock which will index the wheel with respect to the mounting plate. When the caster is locked, it will track straight without wobble or deviation to one side or the other. In order to change direction of the vehicle upon which such a prior art caster is used, the caster must be manually unlocked, which usually entails that the user bend down, reach under the vehicle and disengage the lock. When a new course of travel is reached, the user must then again bend down and reset the lock.

SUMMARY OF THE INVENTION

In accordance with this invention, and improved swivel caster in provided having a mounting plate, a swivel yoke, a swivel bearing, a wheel on the yoke and a means for cammingly locating and indexing the yoke to the plate in a predetermined position.

Accordingly, it is an object of the present invention to provide a swivel caster which will cammingly index for straight tracking.

It is another object of the present invention to provide a swivel caster which will cammingly release an index to track a different direction.

A further object of the present invention is to provide a swivel caster which will disengage a racking index in response to a force at a side angle to the index.

Yet another object is to provide a swivel caster which will cammingly index and de-index without being affected by weight of a vehicle upon which the caster is mounted.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
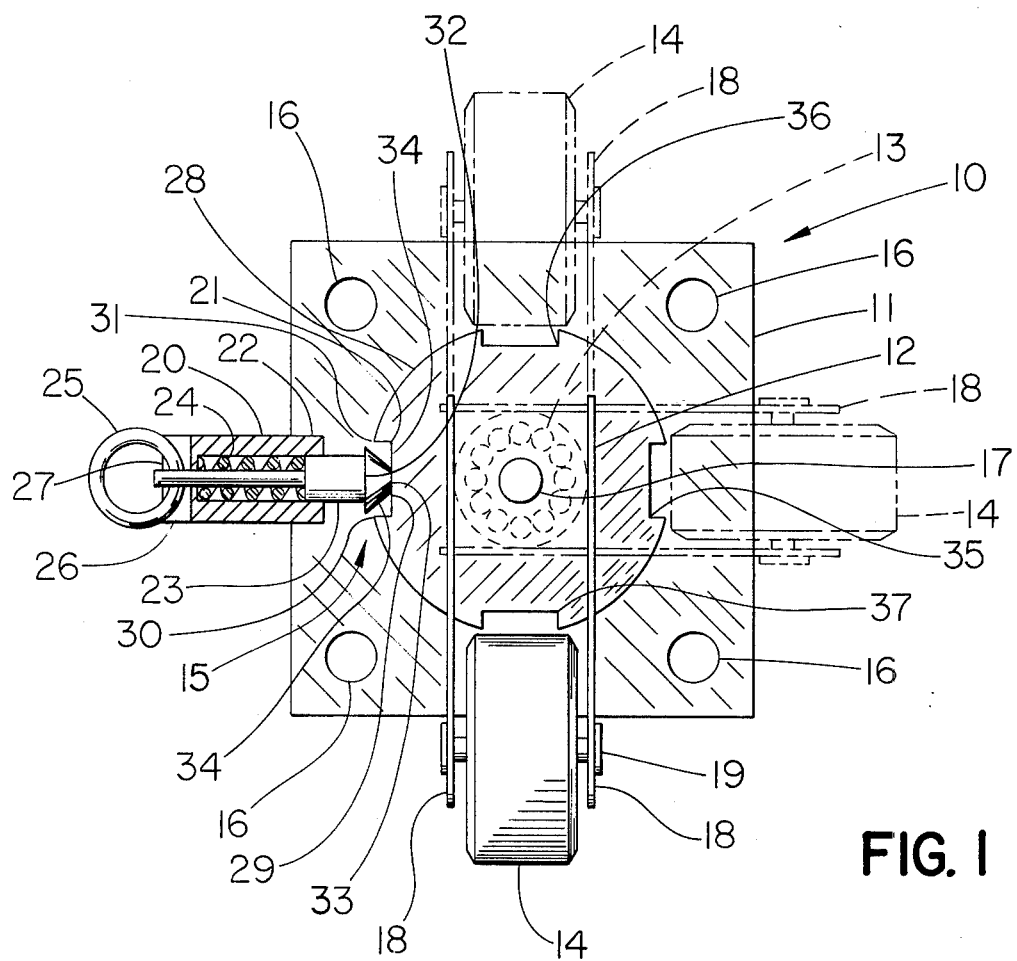
FIG. 1 is a bottom view of a swivel caster provided in accordance with the principles of the present invention, with alternate positions of a caster wheel shown schematically.

The principles of the present invention are particularly useful when embodied in a swivel caster of the type illustrated in FIG. 1, generally indicated by the numeral 10. The swivel caster 10 includes a mounting plate 11, a swivel yoke 12, a swivel bearing 13, a wheel 14, and indexing means generally indicated by 15.

Mounting plate 11 has holes 16 for use in attachment of the swivel caster 10 to some type vehicle (not shown), a specific example of which could be a grocery cart usable for storage, transfer and display of its contents. Extending from plate 11 is a swivel shaft 17, which may be of any of a variety of well known constructions, and provides for retention of yoke 12 to the plate 11, again by well known, previously developed constructions. Between the plate 11 and yoke 12 there is provided a swivel bearing 13, providing a journaled axis for angular rotation or swiveling of yoke 12 with respect to the plate 11. The swivel bearing 13 may be of the ball type as shown or may merely be a metal-to-metal bearing, wherein the yoke 12 rides directly against the plate 11 and shaft 17.

The yoke 12 has a leg 18 extending laterally from the axis of the swivel bearing 13 and at an outer end of the leg 18 is mounted a wheel 14 rotatably journaled about an axle 19. The axis of rotation of the wheel 14, and its intended supporting contact point with a floor (not shown) are laterally spaced from the axis of the swivel bearing 13 in order that the wheel 14 may drag and assume a correct tracking position by effecting rotation of yoke 12 with respect to the mounting plate 11 when the caster 10 is moved, as is the well known function of a swivel caster.

Means for locating and indexing the yoke 12 of swivel caster 10 with respect to the plate 11 are generally indicated by the numeral 15. Index means 15 includes a latch 20 and cam 21, one of which is mounted on the plate 11 and one of which is mounted on the yoke 12. The surfaces of the latch 20 and cam 21 cammingly engage each other to angularly locate, index and release the yoke 12, with respect to the mounting plate 11 about the axis of the swivel bearing 13 as will be explained.

In the preferred embodiment shown, the latch 20 is secured to the plate 11 and the cam 21 is secured to the yoke 12. The latch 20 has a guide 22 which is rigidly mounted to plate 11. Guide 22 movably contains and guides a follower 23 which is resiliently pressured into contact with and against cam 21 by a spring 24. The follower 23 is positioned to operatively pressure against the cam 21 in a direction which is perpendicular to the axis of the swivel bearing 13 and directly against the swivel bearing 13. At the outer end of the follower 23 is a ring 25 which is shown positioned in slot 26 in the guide 22. The ring 25 is a handle for withdrawing the follower 23 from the cam 21 and when the ring 25 and follower 23 are withdrawn outward in guide 22, the ring 25 and follower 23 may be turned and released whereupon the ring will rest against the outer shoulder 27 of guide 22 and the latch 20 will be inoperative.

In the preferred embodiment, the cam 21 is a radial ramp or curve in a round disc 28 rigidly mounted on the yoke 21 co-axially with and in a plane perpendicular to the axis of the swivel bearing 13 for co-rotation with the yoke 12. The cam 21 may be of any profile which is suitable for either imparting or responding to a corresponding motion of follower 23.

The specific profile of cam 21 as shown is a radial ramp formed inwardly from the outer surface of disc 28 by a squared notch and has a central indexing surface 29 which is locate perpendicular to a radius projected from the axis of the swivel bearing 13 to the center of the index surface 29. On the angular sides of the index surface 29, there are biasing surfaces 30, 31 which extend outward from the index surface 29 to the outer surface of disc 28. The cam 21 can be of a different concave or even convex configuration.

The follower 23 in latch 20 has a follower surface 32 which contacts against the outer surface of disc 28 and the surface of the cam 21. The follower surface has a face surface 33 which is positioned and lies in a plane parallel to the axis of the swivel bearing. On each side of the face surface 33, and in the plane in which the cam 21 rotates, there is a follower flank surface 34 which is positioned to angularly contact cam 21 at an angle which enables the cam 21 to displace the follower 23 radially outward from the axis of the swivel bearing 13 against the pressure of the resilient spring 24. The follower surface 32 has a profile of a truncated triangle, but when the follower 23 is a turned screw machine part as shown, the actual surface configuration of the follower surface 32 is frusto-conical.

The height or diameter of follower face surface 33 is at least equal to the thickness of the cam 21 and is preferably greater so that when the follower face surface 33 bears against the cam index surface 29 or the outer surface of the disc 28, the follower face surface 33 presents sufficient area to prevent galling or binding as the cam 21 and follower 23 slide against each other when the yoke 12 rotates with respect to the plate 11.

The arcuate width between the cam biasing surfaces 30, 31 is preferably greater than the corresponding engaged width of the follower flank surface 34 so that the final index of the yoke 12 is maintained by the follower face surface 33 bearing directly against the cam index surface 29.

The effective cam angle between the bias surfaces 30, 31 of cam 21 and the flank surface 33 of follower 23 is about forty-five degrees. With the square notch configuration of cam 21, the included angle of the flank surface 34 is about ninety degrees, which is split evenly about the centerline of the follower 23.

As shown in FIG. 1, there may be additional cams 35, 36, 37, identical to cam 21 and which are positioned to locate and index the yoke 12 at alternate positions which are shown in dotted line as being at every ninety degrees; a fourth position where the yoke 12 would be directly under the latch 20 would be assumed when cam 37 is engaged with latch 20.

In operation and use, a swivel caster 10 is secured to a lower portion of a vehicle (not shown) such as a grocery cart. Typically, such a grocery cart will be rectangular and will have one or two of the present swivel casters 10 mounted at one end and one or two free swivel casters mounted at the other end. The cart (not shown) will be loaded with groceries in a warehouse area and moved upon the casters down an aisleway, usually with the cart moving along its narrowest axis, namely one side first. The cart will track straight and will not wander around in a grocery store aisle due to the swivel caster 10 being indexed, and the cart is turnable just as is a cart with a pair of rigid casters and a pair of swivel casters.

When the cart arrives at the location where it is to display groceries, there will be a confined rectangular space into which the cart must laterally move back-side first. The cart may be pushed or pulled into position in front of the space and the user merely walks around to the open side of the cart and exerts a lateral force upon the cart. In response to the lateral force, the cart begins to move laterally and the free swivel casters freely swivel about to accommodate the new direction.

Figure 2:
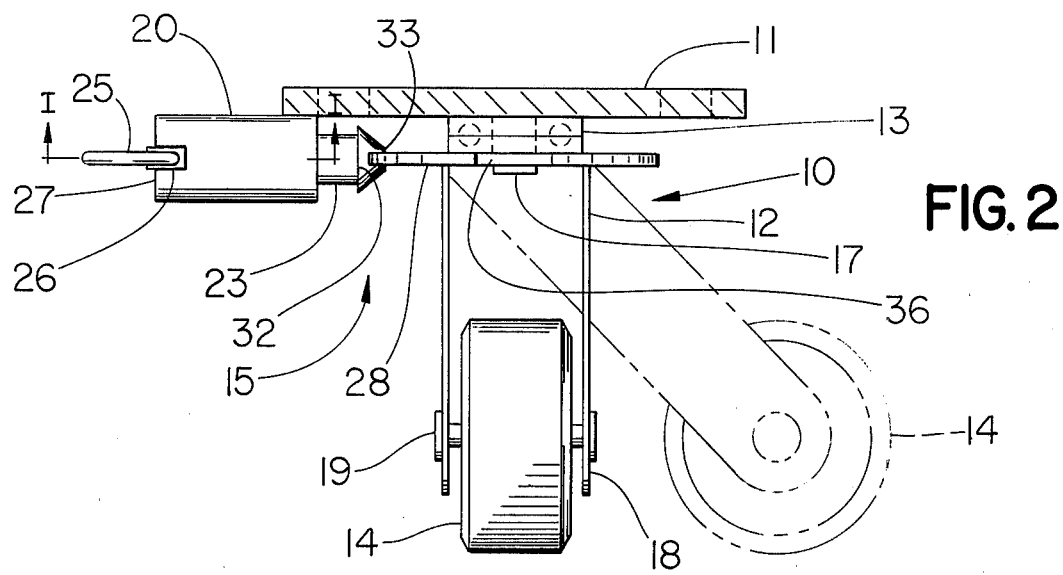
FIG. 2 is a side view of the structure of FIG. 1, with an alternate position of the caster wheel shown in schematic, the sectional portion of FIG. 1 being taken along lines I-I.

The swivel caster 10 responds to the lateral force and movement by generating a torque between the yoke 12 and the plate due to the offset and drag of the wheel 14 from the axis of the swivel bearing 13, best shown in FIG. 2. This torque turns the yoke 12 and the cam 21 with respect to the latch 20. This initial movement of cam 21 causes the follower 23 to move due to contact of the index surface 29 against the follower face surface 33 and to break any static friction between the follower 23 and guide 22 as well to break any stickiness due to foreign matter being in the latch 20. As the yoke 12 and cam 21 turn, one of biasing surfaces 30, 31 contacts the flank surface 34 of follower 23 and when the torque between the yoke 12 and plate 11 reaches a predetermined value, the cam 21 cammingly moves the follower 23 to disengage the index. Upon disengagement, the follower 23 rides upon the disc 28 and the yoke is free to rotate, subject only to the dampening friction between the follower face surface 33 and the disc 28.

As the force against the cart continues and the cart moves sideways, the yoke 12 continues to turn until the follower face surface 33 will run off of the disc 28 and the flank surface 34 comes into a camming engagement with one of another cam 36 or 37 whereupon the follower 23 will resiliently, cammingly bias the yoke into a new index position, which is then also resiliently disengageable as has just been described.

When the follower face surface 33 engages the index surface 29, there is provided a limited amount of low torque movement between the yoke 12 and plate 11 allowing for minute angular adjustmemnt of the yoke in response to turning of the cart and also to continually keep the latch free by minutely moving the follower. However, this limited movement is sufficiently small to maintain a moving vehicle in a stable path.

As the effective angle between either of the bias surfaces 30, 31 and the follower flank surface 34 is about 45°, the force required to release an index and the force generated during biasing into a new position of index are approximately the same. This gives a smooth action in both modes of operation.

The provision of bias surfaces 30, 31 on each side of cam 21 and a corresponding double profile of follower flank surface 34 enables the caster 10 to change index in either direction of an initial index or to locate and bias the caster 10 into a new index from either direction.

Constant engagement of the follower 23 against the cam 21 maintains a smooth tracking direction for a cart which will, when its casters are indexed, not wobble or deviate from its predetermined path with subsequent impacting against nearby structures.

The indexing action of latch 20 and cam 21, because of being operative perpendicular to the axis of the swivel bearing 13, is not sensitive to weight atop the caster 10 and consequently reasonable variations in supported vehicle load or weight do not affect the action of caster 10.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An improved swivel caster having a mounting plate, a swivel yoke, a swivel bearing connecting the yoke to the plate, and a wheel mounted on the yoke with the axis of the wheel spaced from the axis of the swivel bearing, the improvement comprising means for automatically indexing and de-indexing the yoke with respect to the mounting plate, said automatic indexing and de-indexing means having a. a cam formed of round disc rigidly mounted on the yoke co-axially with and in a plane perpendicular to the axis of the swivel bearing, said cam being co-rotatable with the yoke and having
   1. a circular surface concentric to the axis of the swivel bearing
   2. a plurality of radial cam ramps extending radially from the circular surface, said radial cam ramps being spaced every ninety degrees from each other about the circular surface,
   3. a pair of biasing surfaces in each radial ramp, there being a biasing surface on each side of each ramp, and
   4. a central index surface in each ramp and between a respective pair of biasing surfaces, each index surface being in a plane parallel to the axis of the swivel bearing;
b. a latch mechanism mounted upon the mounting plate, said latch having
   1. a cam follower reciprocably displaceable within the latch, said cam follower having a cam engaging follower surface having
      a flat face surface lying in a plane parallel to the axis of the swivel bearing, said face surface having a width less than the width of said cam central index surface, and
      a follower flank surface on each side of the face surface, and
   2. means for resiliently biasing the cam follower into engagement against the cam, with
      a follower flank surface being angularly cammingly engagable with and against a respective cam biasing surface during rotation of the yoke with respect to the mounting plate, said latch being operable for radially biasing the yoke into a position of index upon contact of a follower flank surface against a cam biasing surface, and said cam being operable for displacing the cam follower from a radial ramp to the circular surface upon application of a predetermined torque between the yoke and the plate which torque is sufficient to overcome the pressure of the biasing means through the angular camming engagement between a cam biasing surface and a follower flank surface; and
c. an arcuate width between the cam biasing surfaces, which arcuate width is greater than a corresponding width of the follower flank surfaces so that when the yoke is in a position of radial index with respect to the mounting plate, the yoke is held in a position of index solely by engagement of the follower face surface directly against the cam central index surface under pressure from the biasing means, with there being an arcuate spacing between each respective follower flank surface and cam biasing surface, said arcuate spacing providing a limited amount of resilient radial movement between the yoke and mounting plate to either direction from a position of index and prior to contact of a follower flank surface against a respective cam biasing surface, such radial movement being in response to a low torque between the yoke and plate, which low torque is less than the predetermined torque required to displace the follower from the cam radial ramp to the circular surface.

* * * * *